Oct. 31, 1972          HIDEYO NOZAWA                 3,701,593
        SAFETY DEVICE FOR A NORMAL-TO-REVERSE ROTATION
              CHANGE-OVER SWITCH IN A MOVIE CAMERA
                    Filed Sept. 10, 1971
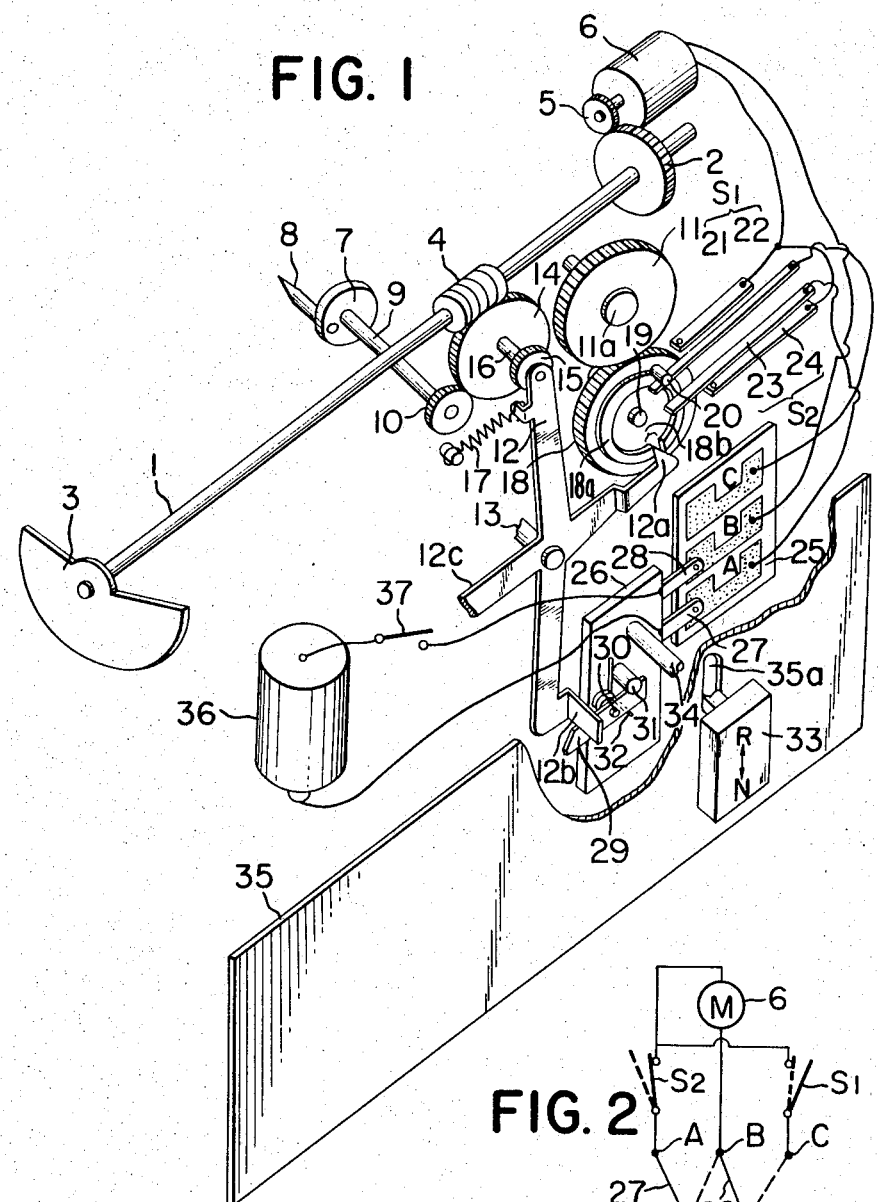
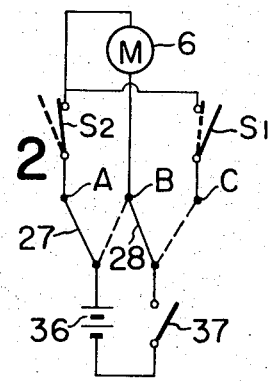

3,701,593
SAFETY DEVICE FOR A NORMAL-TO-REVERSE ROTATION CHANGE-OVER SWITCH IN A MOVIE CAMERA

Hideyo Nozawa, Tokyo, Japan, assignor to Nippon Kogaku K.K., Tokyo, Japan
Filed Sept. 10, 1971, Ser. No. 179,417
Claims priority, application Japan, Sept. 30, 1970, 45/96,787
Int. Cl. G03b 21/36
U.S. Cl. 352—91                                   4 Claims

ABSTRACT OF THE DISCLOSURE

A safety device for preventing a normal-to-reverse change-over switch from being inadvertently changed over to a position causing reverse rotation of a prime mover in a movie camera. The change-over switch is in a motor circuit of the movie camera and includes a slide provided with a lock member which is spring-biased for pivoting in one direction. A clutch member is pivotally mounted to the body of the camera so as to be selectively displaceable into a first position for transmitting the rotation of the prime mover to a film take-up mechanism and into a second position for transmitting the rotation of the prime mover to a film length determining means. The clutch member has one end thereof adapted to engage one end of the lock member when the clutch member is in its first position, preventing the change-over switch from changing into a position causing reverse rotation of said prime mover.

BACKGROUND OF THE INVENTION

Field of the invention

This invention relates to a switching arrangement for changing the direction of rotation of the driving motor between a normal direction and a reverse direction in an electrically driven movie camera, and more particularly to a safety device for such switching arrangement.

Description of the prior art

In conventional switching arrangements of the above described type, a first exposure or taking of, for example, a double-exposure or taking cycle is effected by the use of a so-called film length determining mechanism which causes a predetermined length of film to be driven by an electrical motor in the normal direction for exposure, and then automatically opens the forward rotation circuit of the motor circuit of the movie camera. After the first exposure is made, the same length of previously exposed film is rewound by the operation of a change-over switch which closes a reverse rotation circuit in the motor cir-circuit and thus reverses the direction of rotation of the motor. During reverse operation of the motor, the film length determining mechanism causes the previously exposed predetermined length of film to be rewound and then automatically opens the reverse rotation circuit, readying the previously exposed film for a second exposure or taking.

A film length determining mechanism of the character described can also be used to effect a first, fade-out shot of an overlap photographing technique.

A clutch mechanism is generally provided in these conventional switching arrangements to permit the described film length determining mechanism to be driven by a prime mover, such as an electric motor, an in the manner described. However, these arrangements use a normal-to-reverse rotation change-over switch which operates independently of any other operating member. Therefore, when a normal exposure or shot is desired, the normal-to-reverse switch could be erroneously changed over to a position causing the reverse rotation of the film driving motor with the result that the film is unintentionally transported in the reverse direction and undesirably subjected to a second exposure.

A device has been suggested which prevents the unintentional reverse rotation of the driving motor. This device includes a switch provided in conjunction with the film length determining mechanism. Although this device will prevent undesirable rewinding of the film, it does not of itself prevent the erroneous operation of the movie camera and, if inadvertently actuated, it can cause the user of the movie camera to lose a taking during a movie making operation.

SUMMARY OF THE INVENTION

The present invention solves the above-described problems and provides a safety device which utilizes the above described clutch mechanism to prevent reliably the change-over switch from being inadevertently moved to a position causing reverse rotation of the film.

According to the present invention, the safety device comprises a change-over switch in a motor circuit of a movie camera for changing the rotation of the motor between a normal direction and a reverse direction. The change-over switch has a slide provided with a lock member which is spring-biased for pivoting in one direction. A clutch member is provided which is selectively displaceable to a first position for transmitting the rotation of the motor to a film take-up mechanism and to a second position for transmitting the rotation of the motor to a film length determining mechanism. One end of the clutch member is adapted to engage a corresponding end of the lock member on the slide of the change-over switch when the clutch member is in its first position, whereby the change-over switch is prevented from changing into a position for allowing the reverse rotation of the prime mover when a normal shot is desired.

Various other objects, features and advantages of the invention will be apparent from the detailed description of the preferred embodiments thereof set forth hereinafter and shown in the accompanying drawings.

BRIEF DESCRIPTION OF THE DRAWINGS

FIG. 1 is a schematic perspective view of portions of a movie camera embodying a safety device constructed in accordance with the prevent invention; and FIG. 2 is a schematic diagram of an electric circuit for controlling the operation of the motor used in the movie camera shown in FIG. 1.

DESCRIPTION OF THE PREFERRED EMBODIMENTS

Referring to FIG. 1 of the drawings there is shown a portion of a movie camera including a shutter shaft 1 which has a gear 2 mounted thereon at one end and a shutter sector 3 secured thereto at the other end. A worm gear 4 is also secured to the shutter shaft 1 intermediate thereof. The gear 2 mounted on the shutter shaft 1 engages a pinion 5 mounted on a drive shaft of a prime mover or electric motor 6, so that the matter shaft 1 rotates in a predetermined direction by the rotation of the prime mover 6. The prime mover 6 is connected as described hereinafter in the motor circuit shown in FIG. 2. A disc 7 having a pin 8 studded in one face, is secured to a shaft 9. One end of the shaft 9 is journalled to the movie camera body (not shown) and the other end has mounted thereon a gear 10 which is selectively meshed with a clutch gear 14 in the manner described hereinafter. The disc 7, the pin 8, the shaft 9 and thet gear 10 form a film take-up mechanism which is operated by the rotation of the shutter shaft 1 through the clutch gear 14 and which in turn, rotates a film take-up shaft in a film magazine (not shown).

An intermediate gear 11 is rotatably mounted on a shaft 11a journalled to the camera body (not shown), and the intermediate gear 11 is selectively engageable with a clutch gear 15 to transmit the rotation of the shutter shaft 1 to a film strength determining mechanism described hereinafter. A cross-shaped clutch lever 12 is pivotally mounted on a shaft 13 journalled to the camera body (not shown). The clutch gear 14, which is always in meshing engagement with the worm gear 4 mounted on the shutter shaft 1, is fixed to one end of a shaft 16, and the clutch gear 15 is fixed to the other end of the shaft. The end of the shaft 16 adjacent the clutch gear 15 is secured to one arm of the cross-shaped clutch lever 12. The clutch gears 14 and 15 are arranged to transmit the rotation of the shutter shaft 1 selectively to the gear 10 of the above-described film take-up mechanism and to the intermediate gear 11 coupled to a film length determining mechanism described hereinafter, upon selective pivotal movement of the cross-shaped clutch lever 12. A biasing spring 17 extends between the cross-shaped clutch lever 12 and the camera body (not shown) so as to bias the pivotally mounted cross-shaped clutch lever 12 in a first position so that the clutch gear 14 meshes with the gear 10. The clutch lever 12, the shaft 13, the clutch gear 14, the clutch gear 15, the shaft 16 and the spring 17 form a clutch mechanism.

The left-hand arm 12c of the cross-shaped clutch lever 12 is operatively associated with a known shutter opening adjusting mechanism (i.e. film exposure opening varying mechanism), and is operable from outside the camera through these mechanisms.

A counter gear 18 is rotatably mounted on a shaft 19 which is journalled to the camera body, and has a disc-shaped projected portion 18a formed on one side thereof and partly cut away in a predetermined shape as shown in FIG. 1 so as to provide a groove 18b. The disc-shaped projected portion 18a is arranged so that the groove 18b thereof engages the right-hand hooked arm 12a of the cross-shaped clutch lever 12 when the gear 10 and the clutch gear 14 are in engagement with each other (i.e. when the cross-shaped clutch lever 12 is in its first position), and so that the outer side wall thereof engages the end of the hooked arm 12a when the intermediate gear 11 and the clutch gear 15 are in engagement with each other (i.e. when the cross-shaped clutch lever 12 is in its second position).

An insulating pin 20 is studded in the counter gear 18. When the gear 10 and the clutch gear 14 are in engagement with each other (i.e., when the clutch lever 12 is in its first position), the switch S1, which is defined by the contacts 21 and 22, is opened by engagement of the insulating pin 20 therewith; and the switch S2, which is defined by the contacts 23 and 14, is closed to make a normal rotation circuit. When the intermediate gear 11 and the clutch gear 15 are in engagement with each other (i.e., when the clutch lever 12 is in its second position) to rotate the counter gear 18 by a predetermined amount as described hereinafter, the switch S2 is opened by reason of engagement of the pin 20 therewith, and the switch S1 is closed to effect a reverse rotation circuit. The switches S1 and S2 are connected in the motor circuit as shown in FIG. 2. The counter gear 18, the shaft 19, the insulating pin 20 and the contacts 21 through 24 define a film length determining mechanism.

An insulating plate 25 having change-over terminals A, B and C coupled to the prime mover 6 and the switches S1 and S2 as shown in FIG. 2, is secured to the camera body. A slide 26 is slidably mounted to the camera body, and the change-over switch contacts 27 and 28 as shown in FIG. 2, are secured to the insulating plate 25 with insulating members interposed therebetween. The change-over switch contacts 27 and 28 are arranged such that, in the position shown in FIG. 1, a normal rotation circuit is formed by the interconnection of the change-over switch contacts 27 and 28 with the change-over terminals A and B, respectively, and upon the upwardly movement of the slide 26, a reverse rotation circuit is formed by the interconnection of the change-over switch contacts 27 and 28 with the change-over terminals B and C, respectively.

As shown in FIG. 1, a lock member 29 is pivotally mounted to the slide 26 by means of a shaft 30. One end of the lock member 29 engages a stop pin 31 studded in the slide 26 so as to limit the counter-clockwise pivotal movement of the lock member 29. A spring 32 is provided to bias and maintain the lock member 29 in engagement with the stop pin 31. When the cross-shaped clutch lever 12 is in its first position, the lock member 29 is positioned such that its free end engages the lower bent position 12b to prevent the slide 26 from moving upwardly. When the cross-shaped clutch lever 12 is in its second position, the bent portion 12b of the clutch lever 12 is moved out of engagement with the free end of the lock member 29 to thereby allow the slide 26 to move upward.

An operating knob 33 is provided outwardly of the camera side wall 35 for changing over the motor circuit between the normal rotation mode and the reverse rotation mode. Specifically, the operating knob 33 is secured to a shaft 34 which extends from the slide 26 through a guide slot 35a formed in the side wall 35 of the camera. With this arrangement, the operating knob is made integral with the slide 26 and can move the slide 26 to operate the change-over switch.

As shown in FIG. 2, a power source, such as the battery 36, is connected with the motor circuit and a start switch 37 coupled to a shutter release button (not shown), is provided to selectively connect the power source in this circuit, upon actuation of the shutter release button.

With the described lock arrangement, when the film take-up shaft in the film magazine (not shown) is rotated in the normal direction to thereby take up a length of film photographed during a normal photographing cycle, any erroneous or inadvertent effort to operate the change-over knob 33 and switch the motor circuit into the reverse rotation mode, is blocked by the lock member 29.

Thus, according to the present invention, any erroneous or inadvertent effort to change over the change-over switch into the reverse rotation mode is reliably blocked without any lose of camera taking time, which would otherwise be experienced during photographing.

I claim:

1. In a movie camera, the combination of an electric motor providing a rotational driving force, film take-up means responsive to said rotational driving force for driving a film take-up shaft, an electric circuit for energizing said electric motor, said electric circuit having a switch for changing the rotation of said electric motor between a normal direction and a reverse direction, said switch including a slide member, a lock member mounted on said slide, film length determining means responsive to said rotational driving force for measuring a predetermined length of film, clutch means selectively displaceable to a first position for transmitting the rotational driving force of said electric motor to said film take-up means and a second position for transmitting the rotational driving force of said electric motor to said film length determining means, said clutch means including means for engaging said lock member when both said clutch means is in said first position and said switch in a position in which said electric motor rotates in said normal direction, and for disengaging said lock member when said clutch means is in said second position, whereby said changeover switch is prevented from changing over into a position in which said electric motor rotates in said reverse direction.

2. The combination as in claim 1, including means pivotally mounting said lock member on said slide and means for spring biasing said lock member in one direction, stop means formed on said slide to stop one end of said lock member and wherein said clutch means engages the other end of said lock member.

3. The combination as in claim 1, including means for mounting said slide for vertical movement and an operating knob internally connected to said slide and extending outwardly of the body of said camera.

4. The combination as in claim 1, wherein said clutch means includes a cross-shape lever pivotally connected to a shaft, mounted on said camera, said lever having a laterally extending arm with a hook-shaped end.

References Cited
UNITED STATES PATENTS 3,494,691   2/1970   Katsuyama _____ 352—91 X SAMUEL S. MATTHEWS, Primary Examiner M. H. HAYES, Assistant Examiner